United States Patent

Egawa

[11] Patent Number: 5,596,594
[45] Date of Patent: Jan. 21, 1997

[54] LASER OSCILLATOR

[75] Inventor: Akira Egawa, Oshina-mura, Japan

[73] Assignee: Fanuc Ltd., Yamanashi, Japan

[21] Appl. No.: 505,361

[22] PCT Filed: Jan. 18, 1995

[86] PCT No.: PCT/JP95/00050

§ 371 Date: Aug. 30, 1995

§ 102(e) Date: Aug. 30, 1995

[87] PCT Pub. No.: WO95/20255

PCT Pub. Date: Jul. 27, 1995

[30] Foreign Application Priority Data

Jan. 20, 1994 [JP] Japan ................. 6-19927

[51] Int. Cl.⁶ ................................. H01S 3/081
[52] U.S. Cl. ................. 372/93; 372/99; 372/108; 372/107
[58] Field of Search .................. 372/92, 93, 99, 372/107, 108

[56] References Cited

U.S. PATENT DOCUMENTS

| | | | |
|---|---|---|---|
| 4,962,506 | 10/1990 | Rahn et al. | 372/94 |
| 4,977,574 | 12/1990 | Karube | 372/93 |
| 5,023,886 | 6/1991 | Hobart et al. | 372/93 |
| 5,307,367 | 4/1994 | Karube | 372/93 |
| 5,412,685 | 5/1995 | Egawa et al. | 372/93 |

FOREIGN PATENT DOCUMENTS

| | | | |
|---|---|---|---|
| 0591541A1 | 4/1994 | European Pat. Off. | 372/93 |
| 0187386 | 8/1986 | Japan | 372/93 |
| 1-317696 | 12/1989 | Japan . | |
| 5-235454 | 9/1993 | Japan . | |
| 5-275778 | 10/1993 | Japan . | |
| 405283773A | 10/1993 | Japan | 372/93 |

*Primary Examiner*—Leon Scott, Jr.
*Attorney, Agent, or Firm*—Staas & Halsey

[57] ABSTRACT

A laser resonator (8) has discharge tubes (15) arranged in parallel with each other and bending mirrors (18a, 18b) facing each other at an angle of 90 degrees made therebetween, an output mirror (17) is arranged at a starting end of one discharge tube (15), and a rear mirror (19) is arranged at a terminal end of the other discharge tube (15). Additional reflecting mirrors ($M_1'$, $M_2'$) are arranged so as to cause a laser beam to make a U-turn on a plane inclined at 22.5 degrees with respect to the horizontal plane, whereby the laser beam emitted from the output mirror (17) of the laser resonator (8) and polarized in a direction inclined at 90 degrees to the horizontal plane is successively reflected at the two additional reflecting mirrors ($M_1'$, $M_2'$) and thus is converted into a laser beam $L_{45}$ polarized in a direction inclined at 45 degrees to the horizontal plane.

4 Claims, 5 Drawing Sheets

LASER OSCILLATOR

TECHNICAL FIELD

The present invention relates to a laser oscillator installed in a laser beam machine.

BACKGROUND ART

A laser beam machine equipped with a laser oscillator is widely used as a machine tool for carrying out a machining operation, such as cutting or welding, on a workpiece made of metal or nonmetallic material. FIG. 1 is a perspective view schematically showing, by way of example, the arrangement of a laser beam machine which is generally indicated at 1. The laser beam machine 1 comprises a laser oscillator 2, a laser machine tool 3, and a numerical control device (NC device) 4. A laser beam output from the laser oscillator 2 is guided to the laser machine tool 3 through a shielding duct 5 serving as a light guide path and then reaches a machining head 6 of the laser machine tool 3.

The machining head 6 includes a converging lens for converging light which has been deflected downward by a deflecting mirror in the laser machine tool 3 after passing through the shielding duct 5. Vertical position of the machining head 6 can be controlled by a Z-axis mechanism, whereby the laser beam output from the machining head 6 is converged to a machining spot on a workpiece 7 placed on an X-Y table, the position of which is controlled by the numerical control device (NC device) 4. Usually, the laser beam converged to the machining spot is circularly polarized in order to ensure proper machining, and, therefore, it is desirable that when the laser beam is emitted from the laser oscillator 2, it has already been circularly polarized or linearly polarized at an angle of 45 degrees with respect to the horizontal plane. In the latter case, circularly polarized light can be obtained easily by arranging a phase delaying plate (¼-wavelength plate) in the light path of the beam emitted from the laser oscillator 2, or by using a phase delaying mirror as the deflecting mirror in the laser machine tool 3.

The laser oscillator 2 is equipped with a gas excitation device including a discharge tube, and a laser resonator associated with a gas cooling unit etc. FIG. 2(a) through FIG. 2(c) schematically illustrate, by way of example, the arrangement of a conventionally employed laser resonator, along with additional elements such as a beam phase adjusting unit, wherein FIG. 2(a) is a plan view of parts of the laser resonator forming a resonant light path, as viewed from above a plane formed by the resonant light path, FIG. 2(b) is a front view of almost the entire laser resonator, as viewed from side with respect to the plane formed by the resonant light path, and FIG. 2(c) is a side view of the laser resonator, as viewed from the right-hand end face in FIG. 2(a).

Referring to these diagrams, a laser resonator, generally indicated at 8, comprises a machine frame 9, a gas excitation device 10, and a gas cooling unit 11. The machine frame 9 is composed of front and rear plates 12 and 13, each made of an aluminum plate, and four rods 14 connecting these plates so that the frame 9 may not be readily deformed by external force. Also, in order to minimize dimensional change of the machine frame 9 due to heat, each rod 14 is made of invar steel and is formed as a tubular member (resonator pipe), and cooling water is passed through the pipes 14 during operation of the laser resonator 8. That is, the machine frame 9 is designed so that thermal deformation thereof as a whole may be controlled to an extremely low level.

The gas excitation device 10 includes a discharge tube 15, a high-frequency power supply 16, an output mirror 17 arranged at a starting end (front plate 12) of the discharge tube 15, two bending mirrors 18, 18 arranged at an intermediate portion (rear plate 13) of the discharge tube 15, and a rear mirror 19 arranged at a terminal end (front plate 12) of the discharge tube 15. The gas excitation device 10 is fixed in position between the front and rear plates 12 and 13 via discharge tube holders 20. The bending mirrors 18, 18 are fitted in a reflector block 21 in such a manner that they face each other at an angle of 90 degrees therebetween. The high-frequency power supply 16 serves to produce an electric discharge between opposing electrodes arranged on the peripheral wall of the discharge tube 15, to thereby excite $CO_2$ gas in the discharge tube 15. A laser beam emitted from the excited gas is amplified while traveling back and forth within the discharge tube between the output mirror 17 and the rear mirror 19, and part thereof is outputted frontward (to the left in FIG. 2(a)) from the output mirror 17 as a laser beam 22.

The gas cooling unit 11 is composed of a Roots blower 23, heat exchangers 24 and 25, respectively arranged on the intake and discharge sides of the blower 23, and a ventilating pipe 26. When the Roots blower 23 is in operation, air is circulated through the ventilating pipe 26 while the temperature thereof is adjusted by the heat exchangers 24 and 25, and flows round the surface of the discharge tube 15, though not illustrated, to cool the discharge tube 15.

Reference numeral 27 denotes a shutter mirror which is inserted across the light path when laser beam machining is to be temporarily suspended. When the shutter mirror 27 is in a shut state, the laser beam 22 is deflected from a main path for machining operation and is absorbed by a beam absorber 28.

Reference numeral 29 denotes a beam phase adjusting unit which includes therein a phase delay reflecting mirror 30 and a zero shift reflecting mirror 31. The beam phase adjusting unit 29 serves to convert a linearly polarized laser beam into a circularly polarized laser beam.

The foregoing is the typical arrangement of a conventional laser resonator. However, in order to ensure proper machining conditions with the laser resonator having an arrangement such as one described above, the overall size of the resonator must inevitably be increased. That is, in general, the laser beam output from the laser resonator 8 is converged to perform machining operation, and in order to ensure proper machining condition, there is a certain range for the distance (hereinafter referred to as "light path length") between the beam outlet of the laser resonator 8 and the machining spot, which will realize a good machining conditions. According to the result of an experiment in which cutting performance was tested using a beam of a $CO_2$ gas laser, a desirable light path length was found to be a considerably large value of 3 m to 6 m (optimum light path length) as measured from the output mirror 17 of the laser resonator 8.

Thus, in the case where the conventional arrangement shown in FIG. 2 is employed as a part constituting the laser oscillator 2 disposed as shown in FIG. 1, suitable measures must be taken to ensure an optimum light path length for the laser beam 22 emitted from the output mirror 17. For example, the laser oscillator 2 must be separated from the laser machine 3 and be connected to the same by a long shielding duct 5, which, however, makes it difficult to obtain a compact laser beam machine. Also, it is difficult to obtain a sufficient light path length between the phase delay reflecting mirror 30 and the zero shift reflecting mirror 31 in the beam phase adjusting unit.

To shorten the light path length from the laser resonator to the machining spot, Unexamined Japanese Patent Publication (KOKAI) No. 5-235454 discloses a system in which additional reflecting mirrors are arranged in the laser resonator so as to turn back the laser beam emitted from the output mirror of the resonator, such that the laser beam is outputted from the laser oscillator after traveling for a predetermined light path length from the output mirror. This publication discloses a laser resonator arrangement wherein the additional reflecting mirrors are arranged in the vicinity of the output mirror such that the laser beam emitted from the output mirror is immediately reflected twice and then outputted in a direction opposite to the direction of emission from the output mirror. In the following, this improved type laser resonator is referred to as the "improved laser resonator."

FIG. 3 schematically illustrates an optical system employed in the improved laser resonator. In FIG. 3 and FIGS. 4 and 5 described later, like reference numerals are used to represent like or corresponding component parts in the conventional laser resonator shown in FIGS. 2(a) to 2(c).

Referring to FIG. 3, the laser resonator 8 includes two discharge tubes 15 arranged in parallel with each other, bending mirrors 18a and 18b facing each other at an angle of 90 degrees therebetween, an output mirror 17 arranged at the starting end of one discharge tube 15, and a rear mirror 19 arranged at the terminal end of the other discharge tube 15. Accordingly, the resonant light path is a generally U-shaped path formed by successively connecting the output mirror 17, one discharge tube 15, the bending mirrors 18b and 18a, the other discharge tube 15, and the rear mirror 19 one another. FIG. 3 illustrates two discharge tubes 15, but in practice, these discharge tubes 15 are connected to form a single discharge tube, which is filled with $CO_2$ gas so that the internal space thereof may serve as a resonance space. The arrangement of the resonant light path is almost the same as that of the conventional type shown in FIG. 2.

The improved laser resonator is characterized in that two additional reflecting mirrors $M_1$ and $M_2$ are arranged so as to cause the laser beam to make a U-turn on a plane inclined at 45 degrees with respect to a plane (horizontal plane) formed by the resonant light path. Specifically, the first additional reflecting mirror $M_1$ is arranged in the vicinity of the output mirror 17 such that the laser beam emitted from the output mirror 17 is bent by 90 degrees and then propagated in a direction which is within the plane inclined at 45 degrees with respect to the plane formed by the resonant light path. The second additional reflecting mirror $M_2$ is arranged in such position and orientation that the laser beam reflected from the first additional reflecting mirror $M_1$ is again bent by 90 degrees and then propagated in a direction opposite to, or different by 180 degrees from, the direction in which the laser beam is emitted from the output mirror 17. In order for the laser beam emitted from the laser; resonator to be circularly polarized light C, a phase delaying mirror is used for at least one of the two additional reflecting mirrors $M_1$ and $M_2$.

With this arrangement, when the laser beam 22 leaves the laser oscillator 2, it has already been propagated over at least a light path length corresponding to the longitudinal length of the laser resonator 8. Therefore, when connecting the laser oscillator 2 and the laser machine tool 3 shown in FIG. 1 to each other by a light path with the aforementioned optimum length, the length of the light path between the two (the length of the shielding duct 5) can be shortened correspondingly. Another arrangement which may be employed is one such that the laser beam reflected from the second additional reflecting mirror $M_2$ is passed through a long focal-length lens before being emitted from the laser resonator 8 so that the angle of divergence of the laser beam 22 may be adjusted.

With the use of the improved arrangement of laser resonator, the dimension along the length of the laser resonator can be reduced, as described above. However, the following problems still remain unsolved:

(1) Since the additional reflecting mirrors $M_1$ and $M_2$ are set so as to be inclined at 45 degrees to the horizontal plane, the dimensional size of the laser resonator 8 along the height thereof becomes relatively large (indicated at h in FIG. 3), which is not desirable when making the oscillator compact.

(2) The phase delaying mirror used for at least one of the additional reflecting mirrors $M_1$ and $M_2$ to obtain circularly polarized light generally has short service life and is expensive. Therefore, this adversely affects the maintainability and the cost of the laser resonator 8.

DISCLOSURE OF THE INVENTION

It is an object of the present invention to provide a laser oscillator which has the aforementioned advantageous feature of the improved arrangement that the light path length from the laser oscillator to the machining spot can be reduced and yet solves the above problems, and which is inexpensive, excellent in maintainability, and compact in overall size.

According to a first aspect of the present invention, a laser oscillator comprises a laser resonator and at least one set of additional reflecting mirrors for reflecting and bending a laser beam output from the laser resonator, the laser beam emitted from an output mirror of the laser resonator being outputted from the laser oscillator after being propagated over a predetermined light path length, wherein the set of additional reflecting mirrors is arranged so as to be inclined at 22.5 degrees with respect to a horizontal plane.

According to a second aspect of the present invention, a laser oscillator comprises a laser resonator and at least one set of additional reflecting mirrors for reflecting and bending a laser beam output from the laser resonator, the laser beam emitted from an output mirror of the laser resonator being outputted from the laser oscillator after being propagated over a predetermined light path length, wherein a set of three bending/reflecting mirrors is arranged in a V-shaped configuration in a resonant light path of the laser resonator so that a laser beam is propagated along a V-shaped path formed by the V-shaped configuration of the set of bending/reflecting mirrors, is reflected and bent by the set of additional reflecting mirrors, and then is outputted from the laser oscillator.

According to the present invention having the above arrangement, when the laser beam leaves the laser oscillator, it has already traveled over the predetermined light path length from the output mirror of the laser resonator. Accordingly, the height of the laser oscillator can also be reduced for compactness, without impairing the advantageous feature that the light path length between the laser oscillator and the laser machine tool can be shortened and thus the longitudinal size of the laser oscillator of the laser beam machine can be reduced for compactness. Further, it is possible to obtain a laser beam which is already linearly polarized and inclined at 45 degrees when it is outputted from the laser oscillator, without the need to incorporate a phase delaying mirror in the laser oscillator.

BEST MODE FOR CARRYING OUT THE INVENTION

Figure 4A:
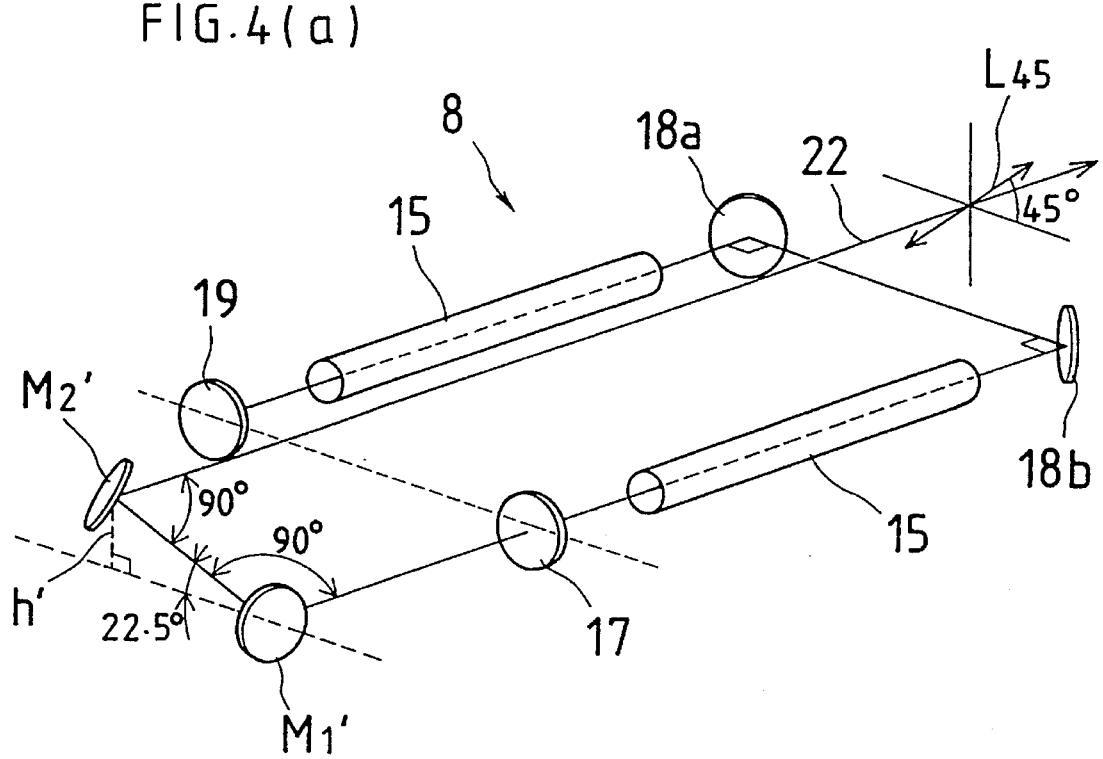
FIG. 4(a) is a schematic view of an optical system of a laser resonator according to a first embodiment of the present invention.
Figure 4B:
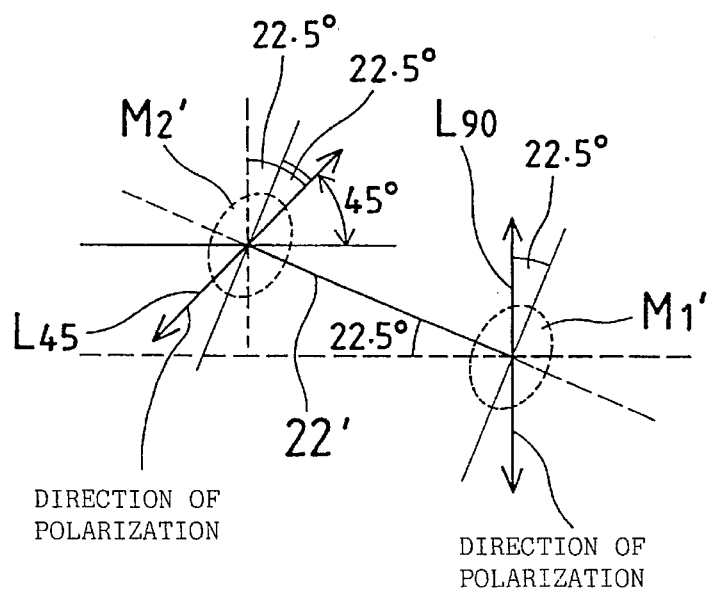
FIG. 4(b) is a diagram illustrating show light is polarized by means of additional reflecting mirrors of the optical system shown in FIG. 4(a)

A first embodiment of the present invention will be now described with reference to FIGS. 4(a) and 4(b). FIG. 4(a) schematically illustrates an optical system of a laser resonator, together with a set of additional reflecting mirrors, and FIG. 4(b) illustrates how light is polarized by means of the additional reflecting mirrors of the optical system.

Figure 2A:
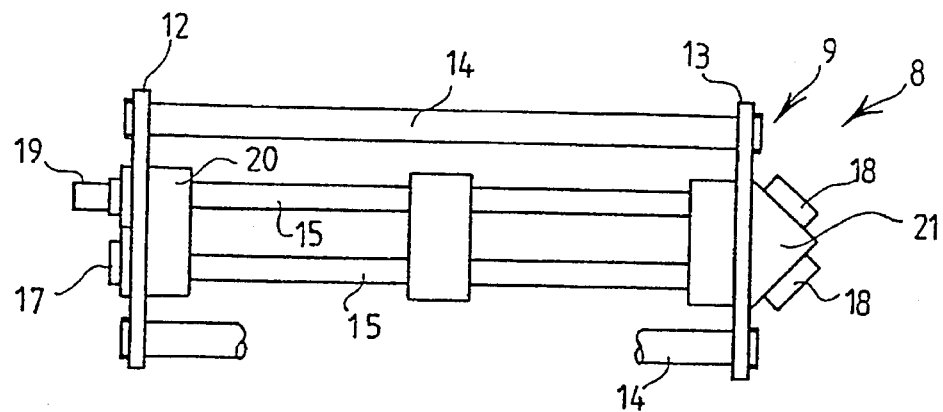
FIG. 2(a) is a plan showing the parts of a resonant light path in a conventional laser resonator, as viewed from above a plane formed by the resonant light path.
Figure 2B:
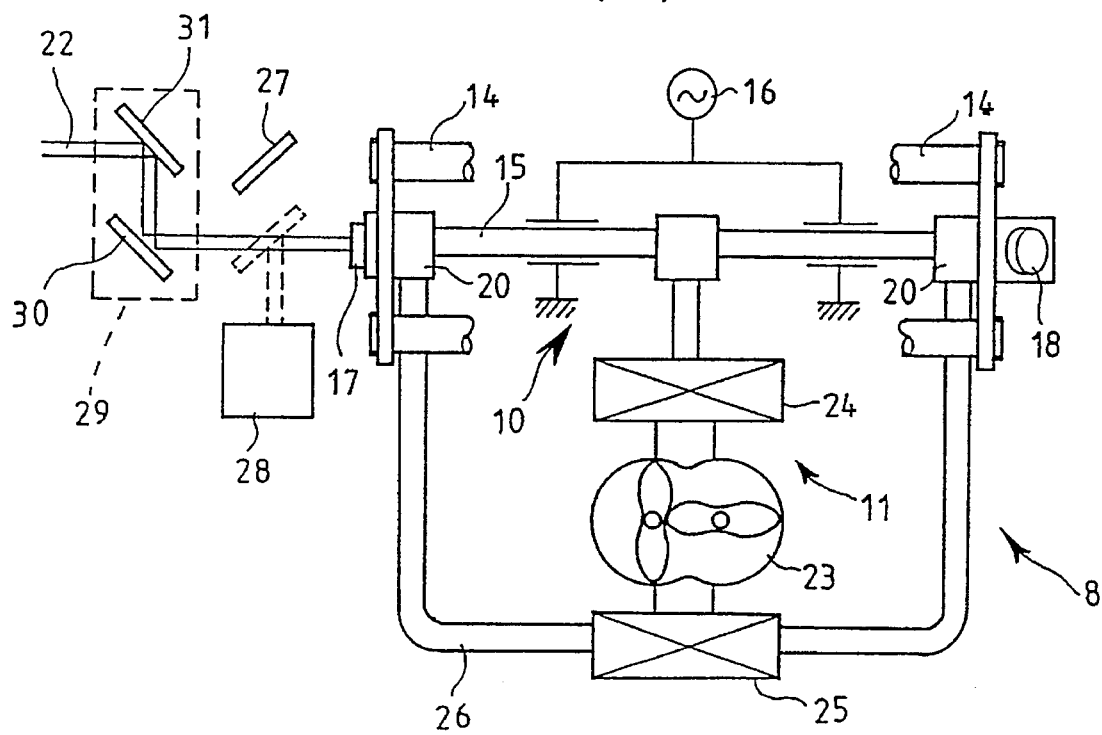
FIG. 2(b) is a front view showing the resonator of FIG. 2(a), along with a beam phase adjusting unit.
Figure 2C:
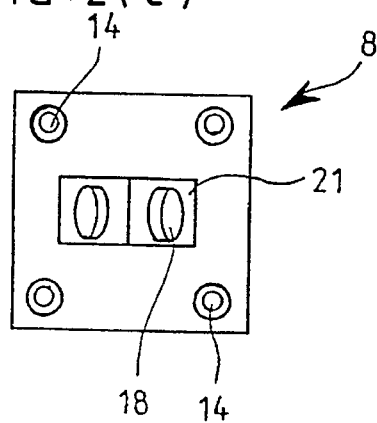
FIG. 2(c) is a side view of the resonator of FIG. 2(a). as viewed from the side of a right-hand end face.

Referring first to FIG. 4(a), a laser resonator 8 includes two discharge tubes 15 arranged in parallel with each other, and bending mirrors 18a and 18b facing each other at an angle of 90 degrees therebetween, thus forming a generally U-shaped resonant light path. An output mirror 17 is arranged at a starting end of one discharge tube 15, and a rear mirror 19 is arranged at a terminal end of the other discharge tube 15. The two discharge tubes 15, which are shown as two separate tubes in the figure, are actually connected to each other to form a single tube, and $CO_2$ gas is filled in the internal space defined by the two discharge tubes, thus forming a resonant space. The arrangement of the resonant light path is basically similar to those of the conventional type and improved type shown in FIGS. 2 and 3, respectively.

This embodiment is characterized by that two additional reflecting mirrors $M_1'$ and $M_2'$ are arranged such that a laser beam makes a U-turn on a plane inclined at 22.5 degrees with respect to a plane (horizontal plane) formed by the resonant light path. Specifically, the first additional reflecting mirror $M_1'$ is arranged in the vicinity of the output mirror 17 in such an orientation that the Laser beam emitted from the output mirror 17 is bent by 90 degrees and then propagated in a direction which is within the plane inclined at 22.5 degrees with respect to the plane formed by the resonant light path. The second additional reflecting mirror $M_2'$ is arranged in such a position and an orientation that the laser beam reflected from the first additional reflecting mirror $M_1'$ is again bent by 90 degrees and then propagated in a direction opposite to, or different by 180 degrees from, the direction in which the laser beam is emitted from the output mirror 17.

Figure 3:
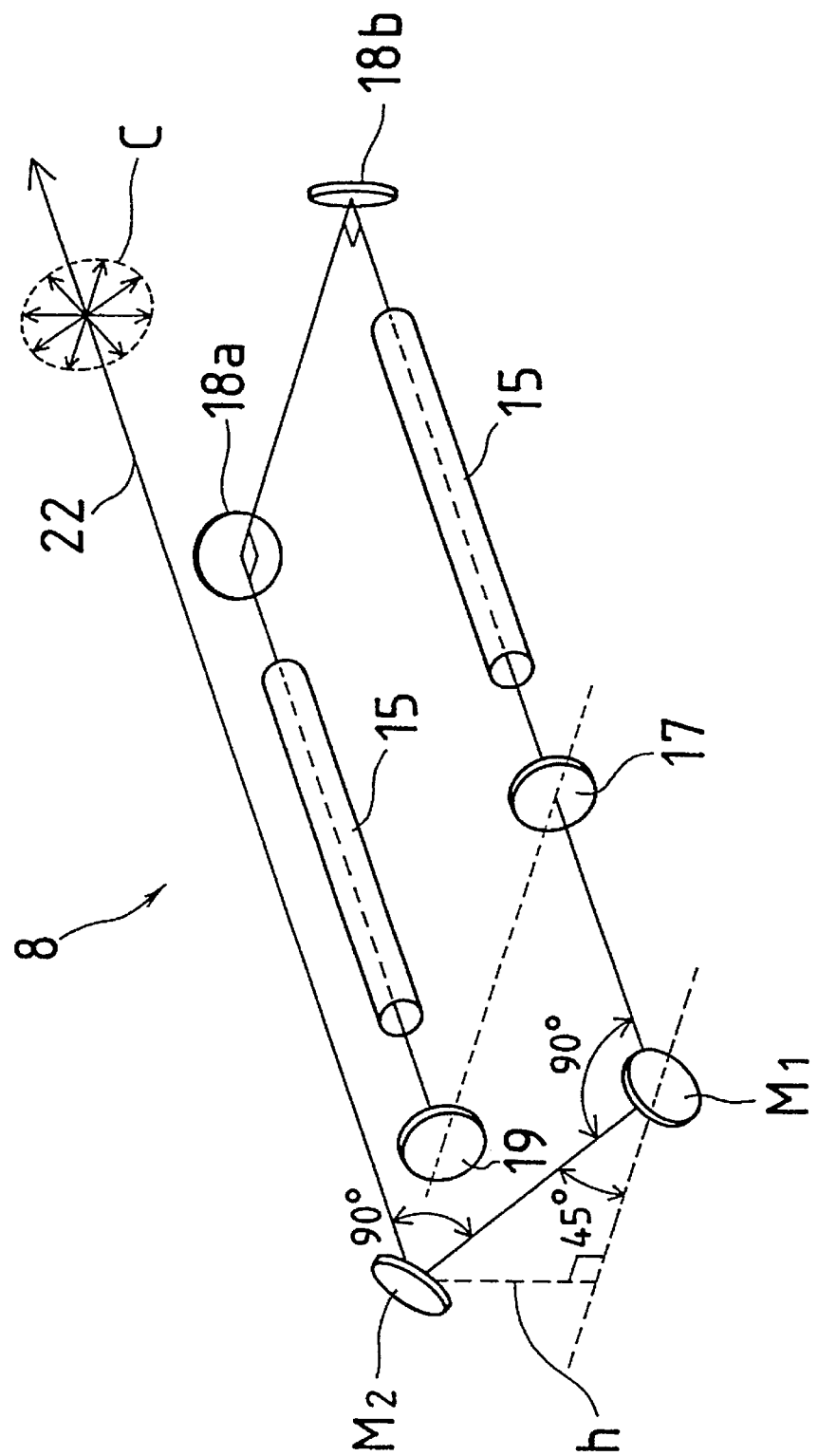
FIG. 3 is a schematic view of an optical system of an improved laser resonator.

This arrangement provides the following two advantageous features:

First, an angular arrangement of the additional is mirrors reduced to 22.5° from 45° with the result that the perpendicular dimentions of the oscillator of the present invention is clearly reduced compared with that of the improved type shown in FIG. 3. For example, where the other elements are constructed to be of the same size as those shown in FIG. 3, the dimension in the direction of height can be reduced approximately to a half (in the figure, h' is about a half of h).

The other important feature is that a laser beam 22 which is linearly polarized ($L_{45}$) in a direction inclined at 45 degrees with respect to the horizontal plane can be obtained, without using a phase delaying mirror for the two additional reflecting mirrors $M_1'$ and $M_2'$. The reason for this will be explained with reference to FIG. 4(b) which illustrates the polarized states of light before and after the reflection at the additional reflecting mirrors $M_1'$ and $M_2'$.

As indicated by arrow $L_{90}$ in FIG. 4(b) along with the first additional reflecting mirror (zero shift mirror) $M_1'$ indicated by broken line, the laser beam emitted from the output mirror 17 of the laser resonator 8 is light which is polarized in a direction inclined at 90 degrees to the horizontal plane, and is reflected at the first additional reflecting mirror $M_1'$. The additional reflecting mirror $M_1'$ is oriented so as to be inclined at 22.5 degrees; therefore, the direction of polarization of the reflected laser beam 22' is inclined by 22.5 degrees with respect to $L_{90}$.

The reflected laser beam 22' is reflected at the second additional reflecting mirror (zero shift mirror) $M_2'$ which is oriented so as to face the first additional reflecting mirror $M_1'$ at 90 degrees therebetween, whereupon the direction of polarization further changes by 22.5 degrees. Consequently, a laser beam polarized in a direction inclined by 45 degrees to the horizontal plane is obtained within the laser resonator 8, as indicated by arrow $L_{45}$ in FIG. 4(b) together with the additional reflecting mirror $M_2'$.

Figure 1:
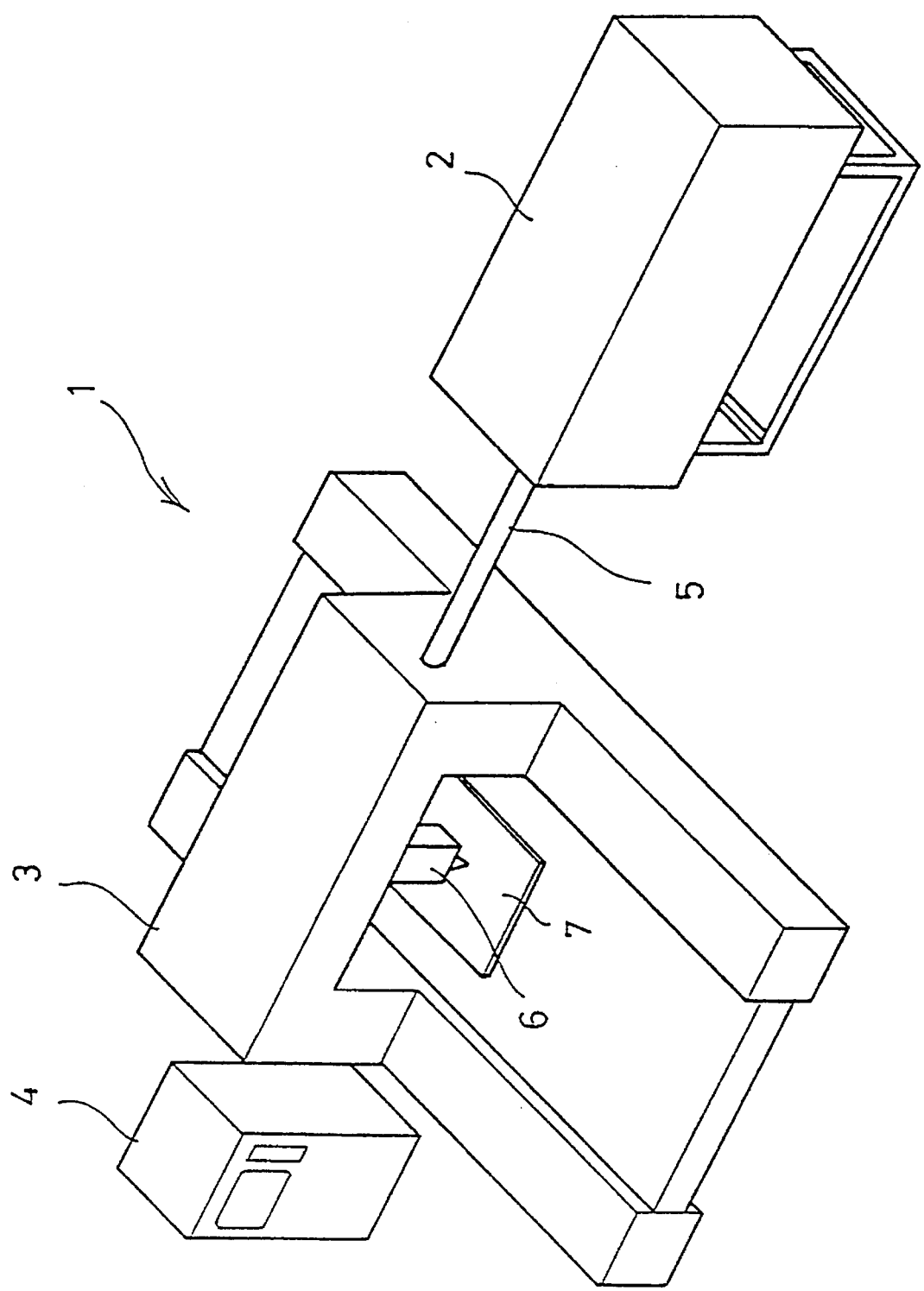
FIG. 1 is a schematic perspective view showing the entire arrangement of a laser beam machine by way of example.

Since the laser beam 22 is already linearly polarized at an angle of 45 degrees when it is outputted from the laser oscillator 2 (see FIG. 1), circularly polarized light can easily be obtained either by arranging a phase delaying plate (¼-wavelength plate) in the light path leading to the machining spot, or by using a phase delaying mirror as the deflecting mirror in the laser machine tool 3, as already mentioned.

Figure 5:
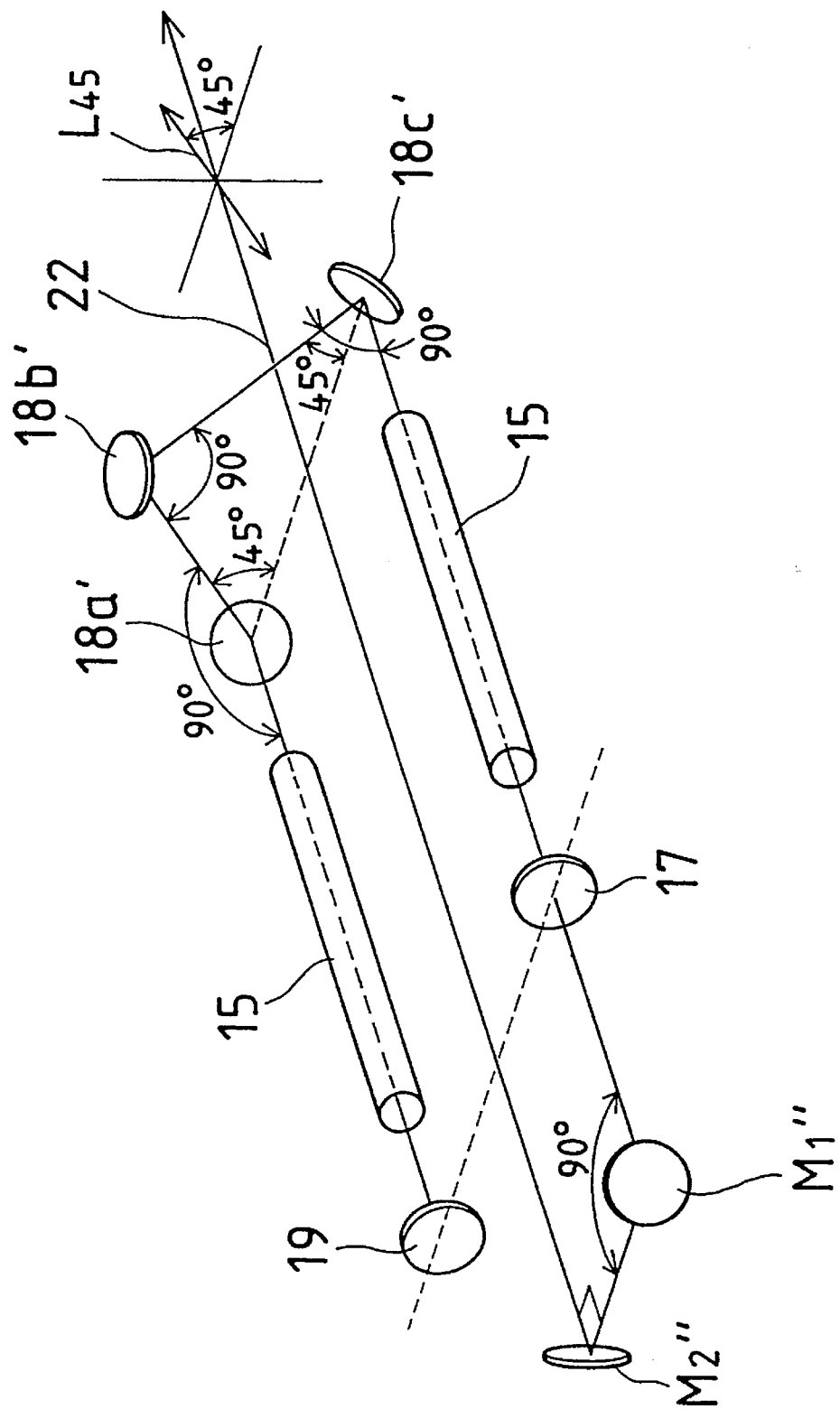
FIG. 5 is a schematic view of an optical system of a laser resonator according to a second embodiment of the present invention.

FIG. 5 schematically illustrates an optical system of a laser resonator according to a second embodiment of the present invention, together with a set of additional reflecting mirrors.

Referring to FIG. 5, a laser resonator 8 includes two discharge tubes 15 arranged in parallel with each other, and a turning-back mirror set composed of three mirrors 18a', 18b' and 18c' arranged in a V-shaped configuration such that adjacent ones face each other at an angle of 90 degrees therebetween, while an output mirror 17 is arranged at a starting end of one discharge tube 15, and a rear mirror 19 is arranged at a terminal end of the other discharge tube 15. The two discharge tubes 15, which are shown as two separate tubes in the figure, are in practice connected to each other to form a single tube, and $CO_2$ gas is filled in the internal space defined by the two discharge tubes, thus forming a resonant space. Further, two additional reflecting mirrors $M_1''$ and $M_2''$ are arranged so that the laser beam emitted from the output mirror 17 makes a U-turn within a plane (horizontal plane) formed by the resonant light path.

In this embodiment, a laser beam polarized in a direction inclined at 45 degrees to the horizontal plane can be obtained within the laser resonator 8 by providing a turning-back mirror set composed of three mirrors 18a', 18b' and 18c' which are arranged in the resonant light path in the V-shaped configuration such that adjacent ones face each other at 90 degrees therebetween, thus making it unnecessary to incline the additional reflecting mirrors $M_1''$ and $M_2''$.

Specifically, due to the coherence of the resonant light within the resonator 8, the direction of polarization of the light is made to be p component (the electric field vector is parallel to the plane of incidence of the light) by the deflecting mirrors 18a' and 18c', and the direction of polarization of the light is made to be s component (the electric field vector is perpendicular to the plane of incidence of the light) by the deflecting mirror 18b', therefore, the plane of polarization of the laser beam emitted from the output mirror 17 is already linearly polarized in a direction inclined by 45 degrees. Accordingly, the additional reflecting mirrors $M_1''$ and $M_2''$ need not be inclined but may be arranged so as to face each other at 90 degrees therebetween, as shown in FIG. 5, such that the propagation direction of the laser beam is turned to the opposite direction (the laser beam makes a U-turn).

With the arrangement of the second embodiment, the dimension of the laser oscillator in the height direction thereof, that is, the height of the section containing the additional reflecting mirrors, can be further reduced, compared with the case wherein the additional reflecting mirrors are inclined at 22.5 degrees. Further, a laser beam output 22 which is linearly polarized ($L_{45}$) in a direction inclined at 45 degrees to the horizontal plane can be obtained without using a phase delaying mirror for the two additional reflecting mirrors $M_1''$ and $M_2''$, as in the case of the first embodiment.

In the foregoing embodiments, the two discharge tubes are arranged in the laser resonator in parallel with each other. However, the arrangement of the discharge tubes according to the present invention is not limited to this, and the present invention can of course be applied to other arrangement conditions in which a single discharge tube or three or more discharge tubes are arranged.

Instead of using a single set of additional reflecting mirrors to prolong the light path length, a plurality of sets of additional reflecting mirrors may be used to obtain a greater light path length within the laser oscillator.

As will be clear from the above description of the embodiments, according to the present invention, the height of the laser oscillator can be reduced, without impairing the advantageous feature of the conventional improved laser oscillator, that is, the light path length between the laser oscillator and the laser machine tool can be shortened because the laser beam outputted from the laser oscillator has already traveled for a predetermined light path length from the output mirror of the laser resonator, and, thus the longitudinal size of the laser oscillator of the laser beam machine can be made compact.

The laser beam is already linearly polarized in a direction inclined at 45 degrees when it is outputted from the laser oscillator. Therefore, it is not necessary to additionally provide a complicated optical system for obtaining circularly polarized light, thus making it possible to simplify the external optical system of the laser beam machine which is liable to contamination. Furthermore, the laser oscillator requires no phase delaying mirror to be built therein, improving the economy and maintainability of the laser oscillator.

I claim:

1. A laser oscillator comprising a laser resonator, and at least one set of additional reflecting mirrors for reflecting and bending a laser beam output from the laser resonator, the laser beam emitted from an output mirror of the laser resonator being outputted from the laser oscillator after being propagated for a predetermined light path length, wherein said at least one set of additional reflecting mirrors is arranged inclining at 22.5 degrees with respect to a horizontal plane.

2. The laser oscillator according to claim 1, wherein said at least one set of additional reflecting mirrors comprises a pair of reflecting mirrors each having no phase delaying effect, the pair of reflecting mirrors being arranged such that the direction of polarization of light emitted from the output mirror and linearly polarized in a direction inclined at 90 degrees to the horizontal plane is first changed by 22.5 degrees by one of the reflecting mirrors, is further changed by 22.5 degrees by the other reflecting mirrors, and is finally emitted to outside of the laser oscillator as a laser beam linearly polarized in a direction inclined at 45 degrees to the horizontal plane.

3. A laser oscillator comprising a laser resonator, and at least one set of additional reflecting mirrors for reflecting and bending a laser beam output from the laser resonator, the laser beam emitted from an output mirror of the laser resonator being outputted from the laser oscillator after being propagated covering a predetermined light path length, wherein a turning-back mirror set composed of three mirrors is arranged in a V-shaped configuration in a resonant light path of the laser resonator so that the laser beam reflected and bent by the set of additional reflecting mirrors is propagated by passing through the V-shaped light path formed with the turning-back mirror set of the V-shaped configuration and is outputted from the laser resonator.

4. The laser oscillator according to claim 3, wherein said set of bending/reflecting mirrors comprises first, second and third reflecting mirrors arranged in the resonant light path in series along a direction from a rear mirror to the output mirror and each having no phase delaying effect, a pair of the first and second reflecting mirrors and a pair of the second and third reflecting mirrors being arranged such that the paired reflecting mirrors face each other at an angle of 90 degrees therebetween, the first and third reflecting mirrors each having a direction of polarization such that an electric vector is parallel to a plane of incidence of light, the second reflecting mirror having a direction of polarization such that an electric vector is perpendicular to a plane of incidence of light, whereby the laser beam emitted from the output mirror is linearly polarized in a direction inclined at 45 degrees to the horizontal plane when being outputted.

\* \* \* \* \*